No. 696,587. Patented Apr. 1, 1902.
F. C. PALMER.
BOLT ANCHOR.
(Application filed Jan. 21, 1901. Renewed Jan. 23, 1902.)
(No Model.)
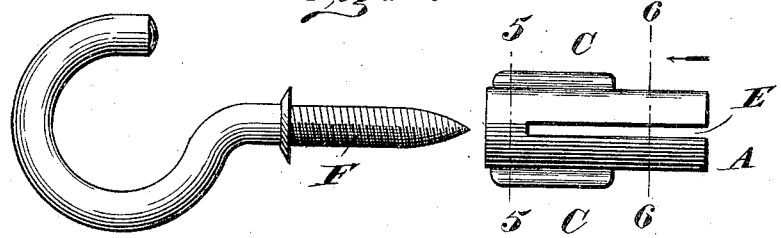
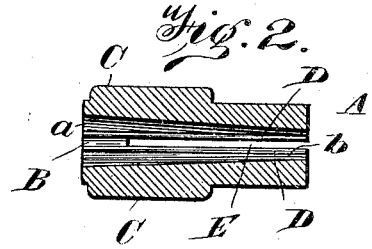
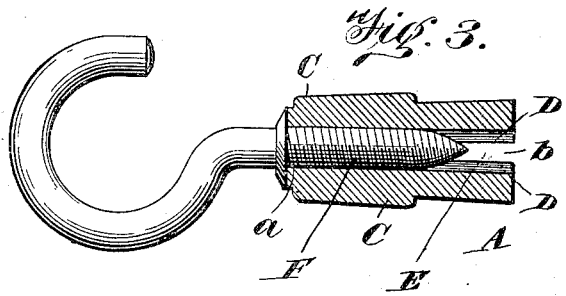
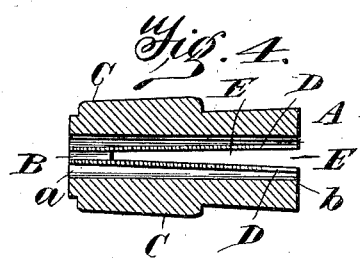
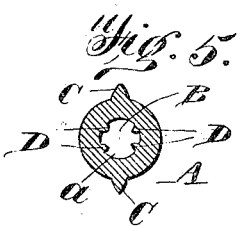
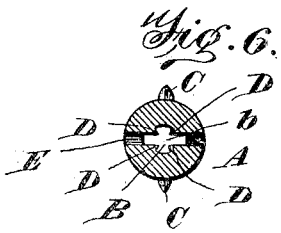
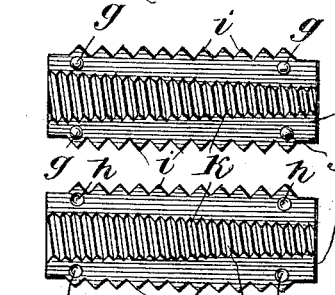
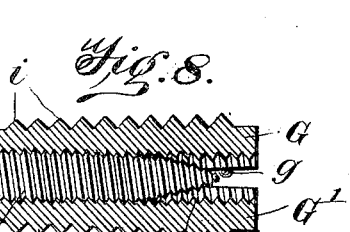
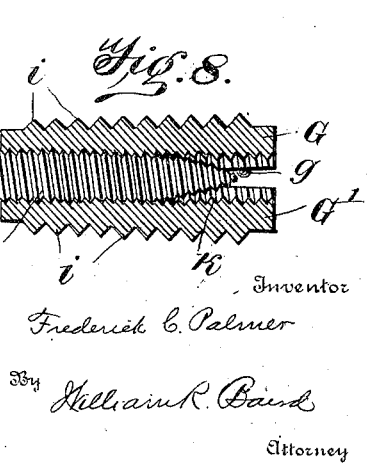
Inventor
Frederick C. Palmer
By William R. Baird
Attorney
Witnesses
Mabel K. Whitman
Herman Meyer
THE NORRIS PETERS CO., PHOTO-LITHO., WASHINGTON, D. C.

UNITED STATES PATENT OFFICE.

FREDERICK C. PALMER, OF BROOKLYN, NEW YORK.

BOLT-ANCHOR.

SPECIFICATION forming part of Letters Patent No. 696,587, dated April 1, 1902.

Application filed January 21, 1901. Renewed January 23, 1902. Serial No. 90,892. (No model.)

*To all whom it may concern:*

Be it known that I, FREDERICK C. PALMER, a citizen of the United States, residing in the borough of Brooklyn, in the city of New York, in the county of Kings and State of New York, have invented a new and useful Improvement in Bolt-Anchors, of which the following is a specification.

This invention relates to bolt-anchors used for the purpose of providing a seat or socket in stone or other hard substances to receive and hold nails or screws, which cannot be driven or threaded into the hard substance itself, the object of the invention being to provide an improved device of this class which can readily be inserted in a bore or hole in the hard substance, will receive and securely hold a nail or screw driven into, and be itself firmly secured therein during its occupancy by the nail or screw.

With this object in view the invention consists of a bolt anchor or screw of soft metal comprising the improved construction, arrangement, and combination of parts hereinafter fully described, and afterward specifically pointed out in the claims.

In the accompanying drawings, which illustrate my invention, Figure 1 represents a view in side elevation of the anchor and a screw for insertion therein separate from each other with the screw in position to be entered. Fig. 2 represents a longitudinal sectional view of the socket or anchor before the screw has been entered. Fig. 3 represents a view in elevation of the parts shown in Fig. 1 with the screw threaded into the socket. Fig. 4 represents a view similar to Fig. 2 of the anchor after a screw has been entered and withdrawn. Fig. 5 represents a transverse sectional view on the plane indicated by the broken line 5 5 of Fig. 1. Fig. 6 represents a transverse sectional view on the plane indicated by the broken line 6 6 of Fig. 1. Fig. 7 represents views of the inside of two members of a bolt-anchor of slightly-modified form. Fig. 8 represents a sectional view of the anchor shown in Fig. 7 with a screw inserted. Fig. 9 represents in section part of the construction of Figs. 7 and 8 with the preferred form of threads.

Like letters of reference mark the same parts wherever they occur in the several figures.

Referring to the drawings by letters, A indicates a socket or bolt-anchor, which consists of a short tube or thimble of soft metal, the bore B of which decreases in diameter from its outer end $a$ to its inner end $b$. This sleeve is provided with outer longitudinal ribs C C, shown as extending from its outer end only part way of its length, but which may extend throughout its length, and with longitudinal inner ribs D D D D, shown as extending throughout its length, although they might be made to extend only part of its length, and while four are shown the number may be varied.

E indicates a slot cut into the inner end of the anchor and extending nearly through its length, thus almost dividing it into two parts.

F indicates a screw of any ordinary form to be inserted in the anchor.

In the practical use of the device the anchor or socket in the form shown in Figs. 1 and 2 is inserted into a hole or bore in a block of stone or other hard substance, as outlined in dotted lines in Figs. 2 and 3, preferably undercut, so as to increase in width from its entrance to its inner end, after which the screw is threaded into the anchor. In its travel in the anchor the threads of the screw cut into the longitudinal soft-metal ribs, and as it proceeds into the decreasing width of bore the inner portion of the anchor is expanded until the position shown in Fig. 3 is reached, the outer longitudinal ribs being forced against the inner walls of the bore in the stone or hard substance and if the density of this substance will permit being embedded therein. These outer ribs prevent the anchor from turning and will be more effective in stone or like hard substances if small grooves are made in the walls of the bore to receive such outer ribs. The inner ribs are readily cut into by the threads and perform all the functions of a full thread in the anchor, while the expansion of the inner parts of the anchor in the bore make the inner end of the anchor wider or thicker than its outer end, and thus prevent the withdrawal of the anchor from the stone by any outward pull on the screw.

In Figs. 7 and 8 the two members or parts G G' of the anchor are entirely separated and when laid together form an anchor or socket of regular or cylindrical form to permit of its easy entrance into the hole in the stone. The meeting faces of the members are provided with corresponding elevations and depressions $g$ and $h$, respectively, which fit each other and prevent the members from sliding upon each other. The bore formed when the members are brought together decreases in width from its outer to its inner end and is screw-threaded, and longitudinal rows of projections or teats $i$ are formed on the outer surfaces.

In Fig. 9 I have shown the preferred form of threads, the threads $j$ of the screw H being separators forming flat surfaces, while the outer edges of the threads K of the socket members G G' are flattened, the parts being proportioned so as to leave spaces at $m$ when the flat surfaces $l$ are in contact with the edge of the thread K. The threading-in of the screw causes the inner ends of the members G G' to separate. The screw-threads do not cut the threads K of the anchor members, but pass between them, so that the body of the screw bears against the blunt outer edges of the threads of the anchor members, thus affording a firm bearing-surface and permitting of an easy forward motion of the screw, so that power is expended in expanding the bolt instead of cutting its way through.

Having thus fully described my invention, what I claim as new, and desire to secure by Letters Patent of the United States, is—

1. A bolt-anchor consisting of a sleeve of soft metal provided with inner longitudinal ribs, substantially as described.

2. A bolt-anchor consisting of a soft-metal sleeve provided with a bore tapering from end to end and with inner longitudinal ribs, substantially as described.

3. A bolt-anchor consisting of a soft-metal sleeve and provided with outer and inner longitudinal ribs, substantially as described.

4. A bolt-anchor consisting of a soft-metal sleeve having a tapering bore and provided with inner and outer longitudinal ribs, substantially as described.

5. A bolt-anchor consisting of a soft-metal sleeve slotted longitudinally from one end throughout nearly its whole length and provided with inner longitudinal ribs, substantially as described.

Witness my hand this 14th day of January, 1901, in the presence of two subscribing witnesses.

FREDERICK C. PALMER.

Witnesses:
HERMAN MEYER,
MABEL K. WHITMAN.